July 6, 1937.　　　G. A. COUNTRYMAN　　　2,086,402
CHECKING GAUGE
Filed Dec. 18, 1934
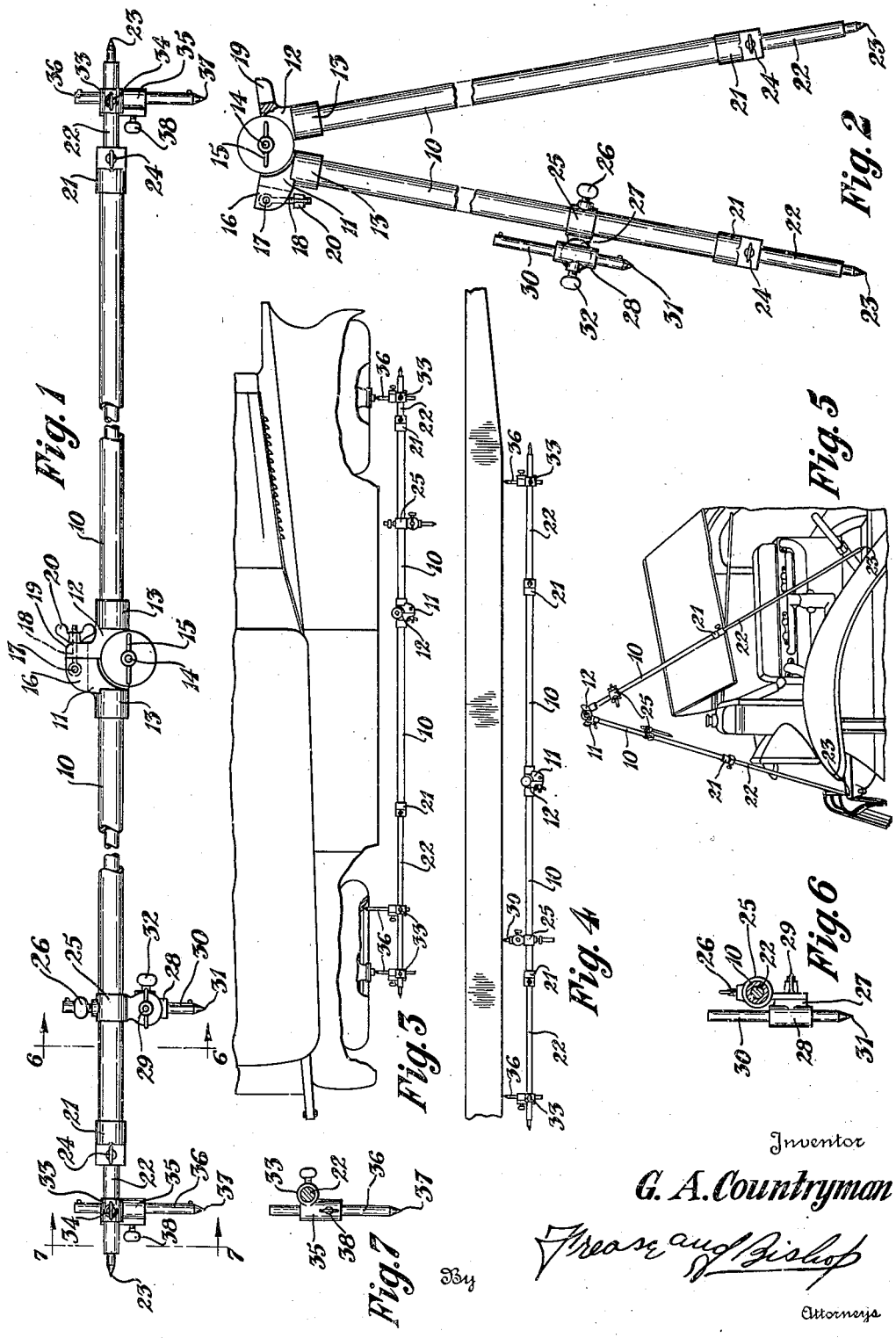
Inventor
G. A. Countryman
By Crease and Bishop
Attorneys Patented July 6, 1937

2,086,402

UNITED STATES PATENT OFFICE 2,086,402

CHECKING GAUGE

Guy A. Countryman, Ashland, Ohio

Application December 18, 1934, Serial No. 758,050

2 Claims. (Cl. 33—152)

The invention relates to gauges for checking the alinement of automobile frames, running gear and the like; and has for its object the provision of a tool of this character so constructed that it is quickly and easily convertible to either a beam compass form of gauge or a divider or ordinary compass form.

Another object is to provide a checking gauge of this character comprising two tubular legs hingedly connected together at one end and having extension rods slidably mounted in their free ends so that the gauge may be used as a dividers or ordinary compass to check points on an automobile frame at opposite sides of an obstacle such as the motor or the like.

A further object is to provide means for locking the hinge against movement with the two tubular legs in longitudinal alinement and slides upon the legs or extension rods thereof carrying transversely disposed pointers whereby the gauge may be used in the manner of a beam compass for checking alinement of automobile side frames, running gear and the like.

The above, together with other objects which will be apparent from the accompanying drawing and following description, or which may be hereinafter pointed out, may be attained by constructing the improved checking gauge in the manner illustrated in the drawing, in which Figure 1 is a side elevation of a checking gauge constructed in accordance with the invention, showing the same in condition for use as a beam compass;

Fig. 2, an elevation showing the improved gauge in condition for use as dividers or ordinary compass;

Fig. 3, a fragmentary plan view of one side portion of an automobile, showing the manner of using the improved checking gauge to check the alinement of the wheels of an automobile, the gauge being in the form of a beam compass, as shown in Fig. 1;

Fig. 4, a fragmentary elevation of a portion of an automobile side frame, showing the manner of using the gauge in beam compass form for checking the frame;

Fig. 5, a fragmentary perspective view of the front portion of an automobile, showing the manner of using the gauge in the form of a large dividers or a compass to check points on opposite sides of the motor;

Fig. 6, a section taken as on the line 6—6, Fig. 1, showing the slide member and pointer upon one of the tubular legs; and Fig. 7, a section taken as on the line 7—7, Fig. 1, showing the slide member and pointer upon one of the extension rods.

Similar numerals refer to similar parts throughout the drawing.

The improved gauge to which the invention pertains includes a pair of tubular legs 10 connected together at one end by a hinge comprising the members 11 and 12, each having a tubular collar portion 13 into which one end of the corresponding tubular leg 10 is inserted and fixed by any suitable means.

The hinge members 11 and 12 are pivotally or hingedly connected together as by a bolt 14 which may be provided with a thumb nut 15 for readily adjusting the hinge. The hinge member 11 is provided at one side with a pair of spaced ears 16 through which is located a transversely disposed pin 17 upon which is pivotally mounted one end of the screw 18 adapted to be received between the spaced ears 19 formed on one side of the hinge member 12, a thumb nut 20 being provided upon said screw for rigidly holding the hinge members in the position best shown in Fig. 1.

A collar 21 may be fixed upon the free end of each of the tubular legs 10 and an extension rod 22 is slidably located within each tubular leg and preferably provided at its outer end with a sharpened point 23, a set screw 24 being provided in each collar for holding the extension rods 22 in adjusted position relative to the tubular legs.

A slide 25 in the form of a casting, forging or the like, may be slidably and rotatably mounted upon either one or both of the tubular legs 10 and arranged to be held in adjusted position thereon as by a set screw 26. A bracket 27 provided with a tubular collar 28 is adjustably mounted upon the slide 25 as by means of a thumb screw 29, and a pointer 30 having a sharpened end 31 is adjustably located through said collar, a set screw 32 being provided for holding the pointer in adjusted position.

One or more slides 33 may be mounted upon each of the extension rods 22 when the gauge is to be used in the form of a beam compass as shown in Figs. 1, 3 and 4, each of these slides being provided with a set screw 34 for holding it in adjusted position upon the rod. A transversely disposed tubular collar 35 is formed upon each of the slides 33 through which is adjustably located a pointer 36 having a sharpened point 37, said pointer being held in adjusted position by means of a set screw 38.

When it is desired to use the gauge in the form of a beam compass, the tubular legs 10 are swung into alinement with each other and the bolt 18 carried by the hinge member 11 is swung down between the ears 19 of the hinge member 12 and the thumb nut 20 on said bolt is tightened so as to hold the tubular legs rigidly in this position.

The slide 25 and pointer 30 carried thereby may be relatively adjusted to the desired position and one or more slides 33 carrying pointers 36 may be mounted upon each of the extension rods 22, the gauge being then assembled, as best shown in Fig. 1. With the gauge in this condition, it may be used for checking the alinement of automobile wheels, as shown in Fig. 3, or for checking frames or other parts, as shown in Fig. 4, the different pointers being adjusted as may be required.

For instance, in checking the alinement of the wheels as shown in Fig. 3, one pointer may be adjusted to the center of each hub cap and if desired, a third pointer may be adjusted to the periphery of the rim of one wheel. It is assumed that the front wheels are set, by the steering gear, as straight forward as possible. With the gauge thus set for the wheels on one side of the automobile, as shown in Fig. 3, it is then applied to the wheels on the opposite side of the vehicle.

For checking automobile frames, as shown in Fig. 4, to determine if there is any drop in the same, three pointers may be adjusted, as shown in said figure, one pointer registering with a given point such as at the rear spring hanger, another at the front cross member and the third point at the rear motor support to the frame. By then checking in the same manner on the opposite side, any drop will be immediately determined.

When it is desired to use the gauge in the form of a large dividers or compass, the slides 33 are removed from the extension rods 22, the slide 25 and pointer 30 carried thereby adjusted to a position such as shown in Fig. 2 so that it will not interfere with the use of the gauge in this form, and the thumb nut 20 is loosened and the bolt 18 swung out of engagement with the ears 19. The tubular legs 10 are then moved upon their hinge joint to the desired position and the thumb nut 15 tightened to hold the legs in adjusted position.

With the gauge in this position, as illustrated in Fig. 2, it may be used to gauge the distance between any two points on opposite sides of an obstacle such as the motor M in Fig. 5, in which one pointer of the gauge is set at the rear motor support and the other pointer at the front cross member of the frame, the gauge in this position straddling the motor or other obstacle.

It should be understood that the uses of the gauge illustrated in Figs. 3, 4 and 5 only suggest some of the many uses for which the same is adapted, these examples being merely for the purpose of illustrating how the gauge may be used in either form.

I claim:

1. A checking gauge for use in the form of a beam compass or in the form of a divider for checking automobile frames and wheels, comprising two tubular legs having cooperating hinge members at one end, a bolt hingedly connecting said hinge members together, a nut upon said bolt for securing said legs in adjusted relative angular positions when the gauge is used as a divider, extension rods telescoped in the free ends of the tubular legs and having pointed ends, an ear upon one hinge member, a pivoted bolt carried by said ear, a pair of spaced ears upon the other hinge member adapted to receive said pivoted bolt when the legs are alined to use the gauge as a beam compass, a nut upon said pivoted bolt for positively clamping the legs in alined position and transversely disposed pointers arranged to be detachably, adjustably mounted upon said extension rods and oppositely disposed to said ears.

2. A checking gauge for use in the form of a beam compass or in the form of a divider for checking automobile frames and wheels, comprising two tubular legs having cooperating hinge members at one end, a bolt hingedly connecting said hinge members together, a nut upon said bolt for securing said legs in adjusted relative angular positions when the gauge is used as a divider, extension rods telescoped in the free ends of the tubular legs and having pointed ends, an ear upon one hinge member, a pivoted bolt carried by said ear, a pair of spaced ears upon the other hinge member adapted to receive said pivoted bolt when the legs are alined to use the gauge as a beam compass, a nut upon said pivoted bolt for positively clamping the legs in alined position, transversely disposed pointers arranged to be detachably, adjustably mounted upon said extension rods and oppositely disposed to said ears, a slide adjustably mounted upon one tubular leg, a pointer pivotally mounted upon said slide, and means for adjusting said last named pointer either transversely of or parallel to said tubular leg, and relative to the pointers upon the extension rods.

GUY A. COUNTRYMAN.